United States Patent Office 3,165,175
Patented Jan. 12, 1965

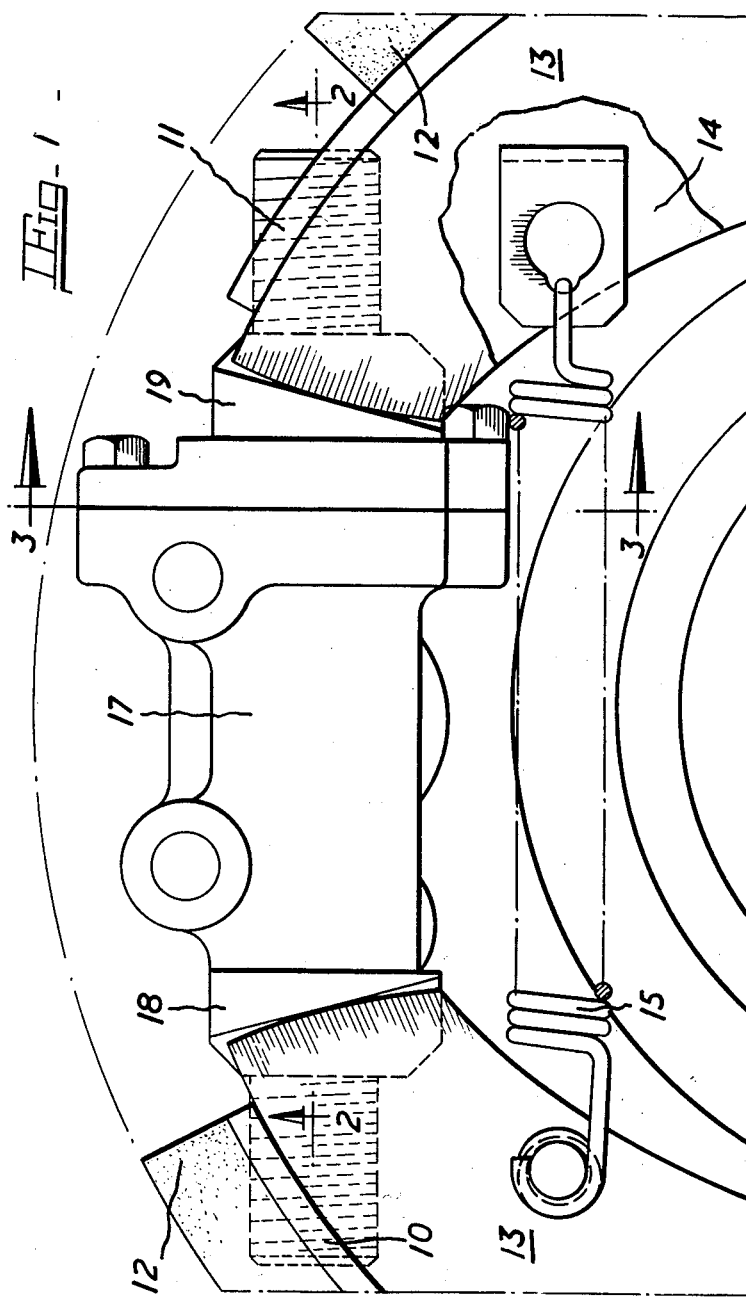

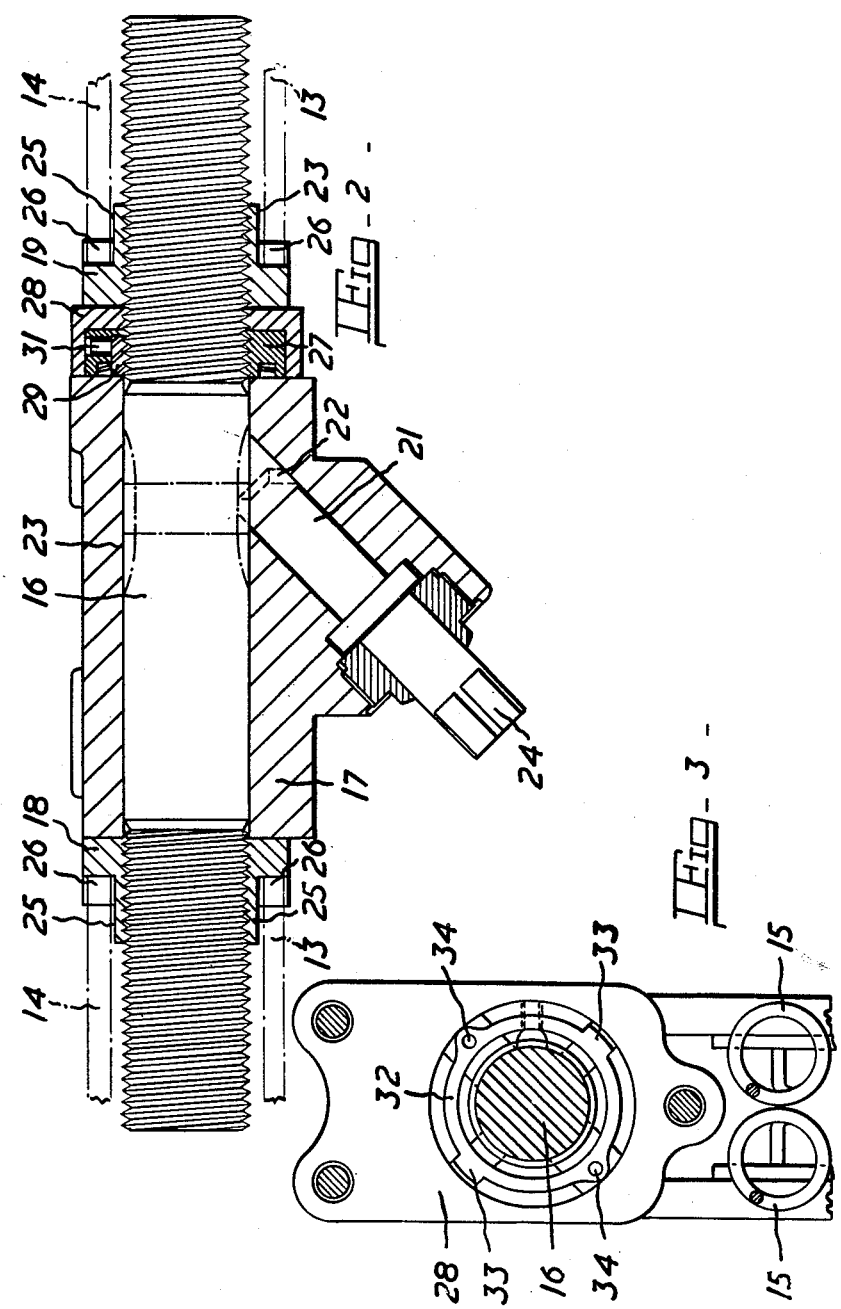

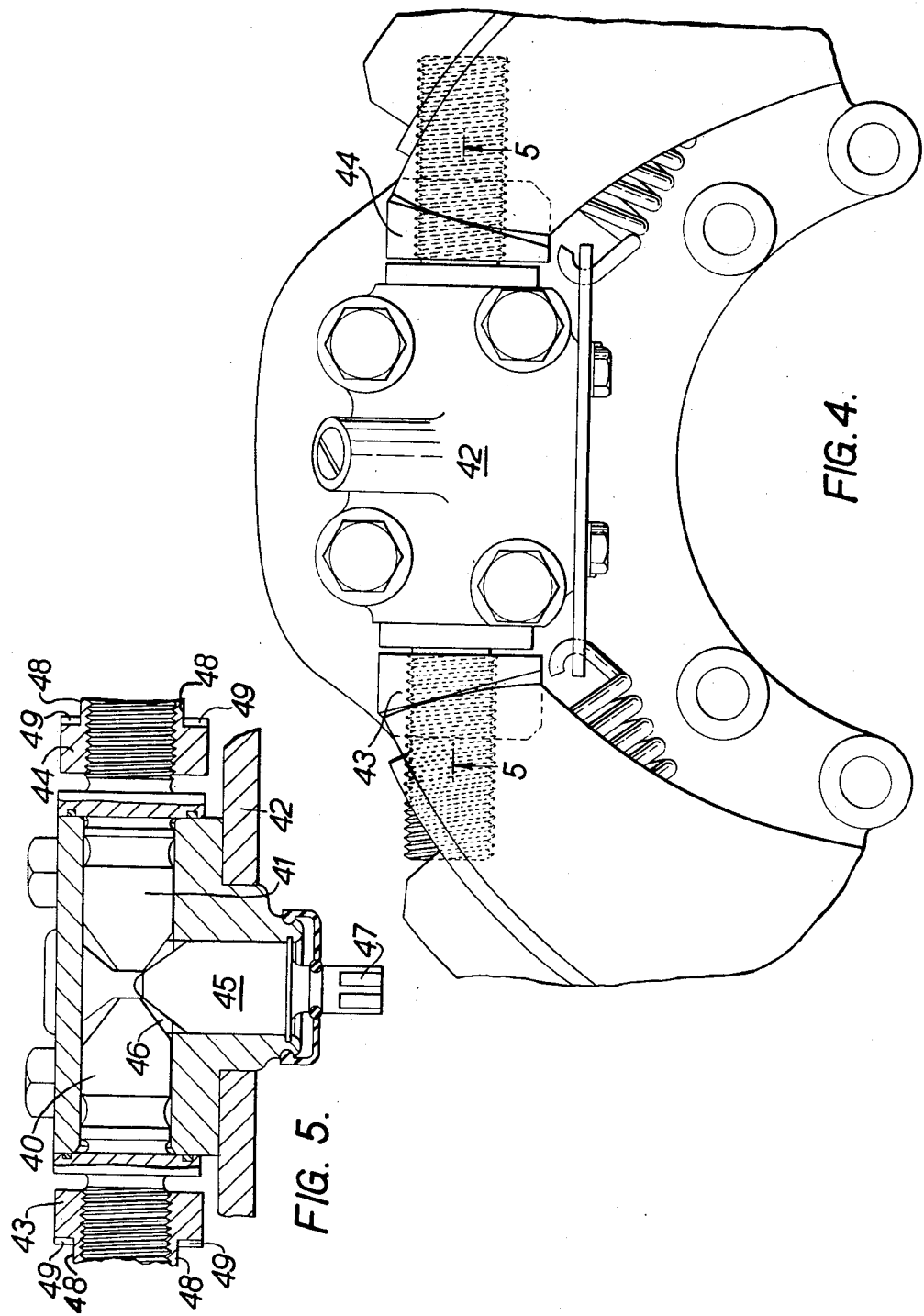

3,165,175
ADJUSTER FOR SHOE DRUM BRAKES
Francis Anthony Dawson Sadler, Little Aston, Sutton Coldfield, England, assignor to Girling Limited, Birmingham, England, a British company
Filed June 25, 1962, Ser. No. 204,829
Claims priority, application Great Britain, June 30, 1961, 23,703/61
5 Claims. (Cl. 188—79.5)

This invention relates to an adjuster for the shoes or friction pads of vehicle brakes.

It is common practice in shoe drum brakes to provide between the ends of the shoes remote from the actuator an adjuster which is operable manually and which provides for the shoe ends abutments which are moved apart to compensate for wear of the shoe linings.

According to my invention an adjuster for the friction members of a brake comprises a housing adapted to be secured to a stationary part, a spindle rotatably mounted in the housing with its ends projecting from the housing and screw-threaded with threads of opposite hand, and nuts in screw-threaded engagement with the ends of the spindle and adapted to be engaged by the friction members.

One improved adjuster is particularly adapted for adjusting the shoes of a shoe drum brake. In a brake of that kind the housing is mounted on the stationary back-plate of the brake between the ends of the shoes remote from the actuator and the nuts are formed with opposed flats adapted to engage between the webs of twin-web shoes or between bifurcated members mounted on the shoe webs so that the nuts are held against rotation, abutment surfaces for the shoe webs or bifurcated members being provided on each side of the nuts at the inner ends of the flats. The abutment surfaces at the inner ends of the flats may be at right angles to a plane containing the axis of the spindle or they may be inclined at a small angle to that plane so that they are radial or approximately so in the assembled brake.

Adjustment to compensate for wear of the shoe linings is effected by rotation of the spindle which moves the nuts outwardly away from each other to adjust the off position of the shoes. Means may be provided for permitting accurate setting and alignment of the nuts initially when assembling the brake.

The spindle is preferably mounted in a housing of substantial length bolted or otherwise secured to the usual stationary back-plate of the brake and is rotated by a shaft of which the outer end is accessible for engagement by a key or spanner and the inner end is formed with bevel or other teeth meshing with complementary teeth on the spindle.

The spindle may be fixed axially so that the nuts provide stationary abutments for the shoes, or it may be slidable axially in the housing so that it can transmit a thrust from the leading shoe to the trailing shoe in a brake of the duo-servo type. In the latter case the teeth on the spindle will be arranged to allow for the axial movement of the spindle.

One convenient form of adjuster in accordance with my invention for adjusting the shoes of a shoe drum brake is illustrated by way of example in the accompanying drawings in which:

FIGURE 1 is an elevation of a portion of a brake showing the adjuster and the adjacent ends of the shoes.

FIGURE 2 is a longitudinal section of the adjuster on the line 2—2 of FIGURE 1.

FIGURE 3 is a transverse section of the adjuster on the line 3—3 of FIGURE 1.

FIGURE 4 is an elevation of a portion of a brake showing a modified adjuster and the adjacent ends of the shoes.

FIGURE 5 is a longitudinal section of the adjuster on the line 5—5 of FIGURE 4.

In the embodiment illustrated in FIGURES 1, 2, and 3, 10, 11 are arcuate shoes of a shoe drum brake and carry friction linings 12 for engagement with a rotatable drum. The shoes have spaced parallel twin webs 13, 14 and the webs at adjacent ends of the shoes engage with an adjuster mounted on the back-plate of the brake. At their other ends the shoes are adapted to be separated by an actuator of any convenient type (not shown).

The shoes are held in engagement with the adjuster by tension springs 15 connected across between the shoes.

The adjuster comprises a spindle 16 of substantial length mounted in a bore in a housing 17 which is bolted or otherwise rigidly secured to the back-plate of the brake. The ends of the spindle are screw-threaded with threads of opposite hand and nuts 18, 19 in screw-threaded engagement with the respective ends of the spindle provide abutments for the shoe webs, rotation of the spindle moving the nuts apart to separate the shoe ends to compensate for wear of the friction linings. Rotation of the spindle is effected by a shaft 21 which is rotatably mounted in a bore in the housing with its axis at an angle of about 45° to that of the spindle, the inner end of the shaft being formed with bevel teeth 22 meshing with complementary teeth 23 on the spindle. The outer end of the shaft is squared as shown at 24 otherwise formed to receive a spanner or key for rotating it.

Each nut has on its outer end two opposed flats 25 adapted to enter between the shoe webs which hold the nut against rotation, and on opposite sides of the nut at the inner ends of the flats there are abutment surfaces 26 for the shoe webs. These surfaces may be at right angles to the axis of the spindle 16 but preferably, as shown in FIGURE 1, they are inclined and are radial or substantially so in the assembled brake.

To allow for accurate setting and alignment of the nuts initially, an adjusting ring 27 is mounted in an annular recess in a collar 28 bolted to one end of the housing between the housing and the nut 19. The ring is in screw-threaded engagement with the spindle and has an internal block or pad 29 of nylon or similar material which is adapted to be forced into engagement with the spindle by a grub-screw 31 to lock the ring to the spindle.

When the brake is being assembled and the flats on the two nuts are not in alignment when both are at the inner ends of their movements the ring 27 is released and the spindle 16 is adjusted axially and the flats are aligned and thereafter the ring is again locked. This ensures accurate centralisation of the shoes and even distribution of the braking effort between the shoes.

The ring 27 rotates with the spindle and a ratchet and pawl or other clicker device is preferably arranged between the inner face of the ring and the adjacent end of the housing to provide an indicator for the angular movement of the spindle when adjusting the brake. In the arrangement illustrated a resilient ring 32 is mounted in a recess in the ring 27 to which it is keyed by radial tongues 33 engaging in notches in the ring 27, the ring 32 having spaced pips 34 adapted to engage with teeth on the end of the housing.

My improved adjuster has a number of practical advantages. One is that as the ends of the spindle enter between the shoe webs the axial length of the adjuster can be kept to a minimum while still providing a wide range of adjustment so that the adjuster is particularly suitable for use in brakes having friction linings of substantial thickness.

Another advantage is that the spindle is supported over a considerable length in the housing against any transverse load on its ends such as may be applied to the spindle when wear of the friction linings has taken place and the movement of the shoe ends is no longer substantially in alignment with the axis of the spindle.

In a modification the single spindle for adjusting both nuts simultaneously may be replaced by two separate spindles which may be in axial alignment or inclined at a small angle to each other and may be actuated by a common rotatable shaft or by separate shafts. In the embodiment illustrated in FIGURES 4, 5 and 6 the adjuster comprises two spindles 40 and 41 mounted in a bore in a housing 42 which is rigidly secured to the back-plate of the brake. The outer end of each spindle is screw-threaded with threads of the same hand and nuts 43 and 44 in screw-threaded engagement with the screw-threaded end of each spindle provide abutments for the shoe ends, rotation of the spindles moving the nuts apart to separate the shoe ends to compensate for wear of the friction linings. Rotation of the spindles is effected by a shaft 45 which is rotatably mounted in a bore in the housing with its axis at right angles to that of the spindles, the inner end of the shaft being formed with bevel teeth 46 meshing with complementary teeth 46 on the inner end of each spindle. The outer end of the shaft is squared as shown at 47 to receive a spanner or key for rotating it.

Each nut has on its outer end two opposed flats 48 adapted to enter between the shoe webs which hold the nuts against rotation, and on opposite sides of the nut at the inner ends of the flats there are abutments surfaces 49 for the shoe webs. These surfaces may be at right angles to the axis of the spindles 40 and 41 but preferably, as shown in FIGURE 4, they are inclined and are radial or substantially so in the assembled brake.

When the brake is being assembled and the flats on the nuts are not in alignment with the shoe webs, the spindles can be withdrawn outwards from the housing and each spindle can be rotated independently until the nut is in the desired position. This has the advantage that if the shoes should wear unevenly with respect to each other, one spindle can be withdrawn and the other spindle can be rotated by the shaft to adjust the position of its adjacent shoe to compensate for this uneven wear.

While an adjuster in accordance with my invention is intended primarily for adjusting simultaneously both shoes of a shoe-drum brake it can be modified for adjusting only one shoe or for adjusting the friction members of a disc brake.

I claim:

1. An adjuster for the shoes of a shoe-drum brake incorporating shoes mounted on a stationary back-plate and an actuator for the shoes, comprising a housing adapted to be secured to the back-plate between the ends of the shoes remote from the actuator, spindle means rotatably mounted in the housing and including screw-threaded ends projecting from the housing, nuts in screw-threaded engagement with said ends of said spindle means, said nuts having opposed flats adapted to engage between spaced portions of webs of said shoes, abutments for said portions on the nuts on each side of and at the inner-ends of said flats, said screw-threaded engagement of said nuts with said ends of said spindle means being constructed and arranged that upon rotation of said spindle means said nuts move simultaneously in opposite directions for adjustment of the position of said shoes, said spindle means being axially slidable in said housing to permit initial adjustment of said nuts with respect to said spaced portions, and releasable means for retaining said spindle means in its operative position upon completion of said initial adjustment.

2. An adjuster for the shoes of a shoe-drum brake incorporating shoes mounted on a stationary back-plate and an actuator for the shoes, comprising a housing adapted to be secured to the back-plate between the ends of the shoes remote from the actuator, a pair of spindles rotatably mounted in the housing, one end of each spindle projecting from opposite ends of said housing, screw-threaded portions provided at the outer end of the projecting end of each spindle, nuts is screw-threaded engagement with said screw-thread portions, said nuts having opposed flats adapted to engage between spaced portions of webs of said shoes, abutments for said portions on the nuts on each side and at the inner ends of said flats, said screw-threaded engagement of said nuts with said spindles being constructed and arranged that upon rotation of said spindles said nuts move simultaneously in opposite directions for adjustment of the position of said shoes, each spindle being axially slidable in said housing to permit initial adjustment of its nut with respect to its spaced portion, and releasable means for retaining said spindles in their operative position upon completion of said initial adjustment.

3. An adjuster as claimed in claim 2, and further including an externally accessible shaft rotatably mounted in said housing and a geared coupling between said shaft and said spindles.

4. An adjuster for the shoes of a shoe-drum brake incorporating shoes mounted on a stationary back-plate and an actuator for the shoes, comprising a housing adapted to be secured to the back-plate between the ends of the shoes remote from the actuator, a pair of spindles rotatably mounted in the housing, one end of each spindle projecting from opposite ends of said housing, screw-threaded portions provided at the outer end of the projecting end of each spindle, nuts in screw-threaded engagement with said screw-threaded portions, said nuts having opposed flats adapted to engage between spaced parallel twin webs of said shoes, abutments for said webs on the nuts on each side and at the inner ends of said flats, said screw-threaded engagement of said nuts with said spindles being constructed and arranged that upon rotation of said spindles said nut moves simultaneously in opposite directions for adjustment of the position of said shoes, each spindle being axially slidable in said housing to permit initial adjustment of its nut with respect to said webs on its adjacent shoe, and an externally accessible shaft rotatably mounted in said housing wherein the inner of said shaft is formed with gear teeth adapted to engage with corresponding gear teeth formed at adjacent inner ends of said spindles upon completion of said initial adjustment.

5. An adjuster as claimed in claim 4, wherein the gear teeth formed at the inner end of said shaft and adjacent ends of said spindles are bevel teeth.

References Cited in the file of this patent

UNITED STATES PATENTS

| | | |
|---|---|---|
| 1,798,936 | Frehse | Mar. 31, 1931 |
| 2,006,397 | La Brie | July 2, 1935 |
| 2,050,702 | Jackson | Aug. 11, 1936 |
| 2,065,679 | Fisher et al. | Dec. 29, 1936 |
| 2,102,852 | La Brie | Dec. 21, 1937 |
| 2,146,207 | Farkas | Feb. 7, 1939 |
| 2,318,286 | Brey et al. | May 4, 1943 |
| 2,459,958 | Parnell | Jan. 25, 1949 |

FOREIGN PATENTS

| | | |
|---|---|---|
| 780,738 | France | Feb. 11, 1935 |